United States Patent
Wolter et al.

(10) Patent No.: US 8,194,789 B2
(45) Date of Patent: Jun. 5, 2012

(54) INPUT SIGNAL COMBINER SYSTEM AND METHOD

(75) Inventors: Chad Wolter, Breezy Point, MN (US); Damian Bonicatto, Pequot Lakes, MN (US); James Glende, Baxter, MN (US)

(73) Assignee: Hunt Technologies, LLC, Pequot Lakes, MN (US)

( * ) Notice: Subject to any disclaimer, the term of this patent is extended or adjusted under 35 U.S.C. 154(b) by 658 days.

(21) Appl. No.: 12/315,798

(22) Filed: Dec. 5, 2008

(65) Prior Publication Data
US 2009/0147863 A1 Jun. 11, 2009

Related U.S. Application Data

(60) Provisional application No. 60/992,480, filed on Dec. 5, 2007.

(51) Int. Cl.
*H03K 9/00* (2006.01)
(52) U.S. Cl. ........ 375/316; 375/136; 375/219; 375/322; 375/345; 375/377
(58) Field of Classification Search .......... 375/150, 375/295, 299, 316, 322, 327, 342, 345, 346, 375/347, 350, 135, 136, 146, 147, 219, 222, 375/260, 377
See application file for complete search history.

(56) References Cited

U.S. PATENT DOCUMENTS

| | | | | |
|---|---|---|---|---|
| 5,420,799 A * | 5/1995 | Peterson et al. | ................. | 702/62 |
| 5,852,630 A * | 12/1998 | Langberg et al. | ............. | 375/219 |
| 6,906,655 B1 * | 6/2005 | Cox | .............................. | 341/155 |
| 7,072,779 B2 | 7/2006 | Hancock et al. | | |
| 7,283,074 B2 | 10/2007 | Sheng et al. | | |
| 2005/0017847 A1 * | 1/2005 | Bonicatto et al. | ........ | 340/310.01 |
| 2005/0017848 A1 * | 1/2005 | Flen et al. | ................ | 340/310.01 |
| 2005/0017849 A1 * | 1/2005 | Flen et al. | ................ | 340/310.01 |
| 2005/0060107 A1 * | 3/2005 | Rodenberg et al. | ............ | 702/62 |
| 2005/0200459 A1 * | 9/2005 | White | ...................... | 340/310.01 |
| 2006/0052958 A1 * | 3/2006 | Hancock et al. | ................ | 702/60 |
| 2008/0015742 A1 * | 1/2008 | Kulyk et al. | .................. | 700/295 |
| 2008/0068141 A1 * | 3/2008 | Yokomitsu et al. | ...... | 340/310.11 |
| 2010/0039242 A1 * | 2/2010 | Refaeli et al. | ............ | 340/310.12 |

OTHER PUBLICATIONS

International Search Report and Written Opinion for PCT/US2009/047350 mailed Aug. 7, 2009.

* cited by examiner

*Primary Examiner* — Hirdepal Singh
(74) *Attorney, Agent, or Firm* — Kilpatrick Townsend & Stockton LLP

(57) ABSTRACT

Disclosed are various embodiments of an input signal combiner. In one embodiment, a receive stage receives a multi-phase waveform and separates the multi-phase waveform into a plurality of waveforms. Analog-to-digital converters convert the plurality of analog waveforms into at least one digital signal. At least one gain stage adjusts an amplitude of each of the digital signals and combines the amplitude adjusted digital signals into at least one gain adjusted combined signal. A signal extraction stage extracts an inbound signal from the at least one gain adjusted combined signal according to a demodulation scheme.

24 Claims, 6 Drawing Sheets

INPUT SIGNAL COMBINER SYSTEM AND METHOD

CROSS REFERENCE TO RELATED APPLICATION

This application claims priority to co-pending U.S. Provisional Application Ser. No. 60/992,480, filed Dec. 5, 2007, which is hereby incorporated by reference herein in its entirety.

TECHNICAL FIELD

The disclosure relates generally to a power distribution system, and more specifically, to communications over distribution lines in a power distribution system.

BACKGROUND

In a power distribution system, usage metering data may be transmitted over a distribution line or a communications link to a power distribution substation, central office, billing center, or the like. Various modulation schemes may be employed between an endpoint and a distribution substation, central office, billing center, or the like.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are systems and methods of combining phases of a multi-phase waveform having a data signal encoded thereon in order to improve the signal to noise ratio of system incorporated such waveforms for data transmission. According to embodiments of the disclosure, data can be encoded on one or more of the phases of a multi-phase waveform. In addition various environmental, electrical, and other conditions can affect the quality of a waveform or introduce noise into a signal as it is transmitted from an origin to a destination. In addition, data can be segmented and/or bleed onto other waveforms of the multi-phase waveform. Accordingly, embodiments of the disclosure can combine the various waveforms comprising a multi-phase waveform into a single signal from which digital or analog data can be extracted at an endpoint. In one embodiment, the various waveforms can be summed to arrive at a single resultant waveform. In other embodiments, the three phases can be combined according to varying schemes with the resultant combinations sampled to determine which combination arrives at an optimal signal combination with a satisfactory signal to noise ratio.

Accordingly, to facilitate data transmission in such a system as well as to provide for configurable combination of waveforms in a communication system employing a multi-waveform signal, embodiments of the disclosure can also provide the flexibility to adjust the amplitude, phase, and/or other characteristics of the various waveform of a multi-phase waveform to arrive at an optimal signal combination of the various waveforms in order to increase the signal to noise ratio of a communications system incorporate such a waveform. It should be noted that three phase electric power is a common method of alternating current (AC) electric power transmission. Accordingly, a three phase waveform can be employed to transmit AC electric power from a distribution point to an endpoint, which can be a customer premises, a substation, etc. According to embodiments of the disclosure data can be encoded on one or more of the three wave forms comprising a three phase waveform to provide for data services, usage metering, control signal transmission, etc. While embodiments of the disclosure are discussed herein with reference to power distribution systems, it should be appreciated that the systems and methods disclosed can be employed in any software radio system and/or communications system.

Figure 1:
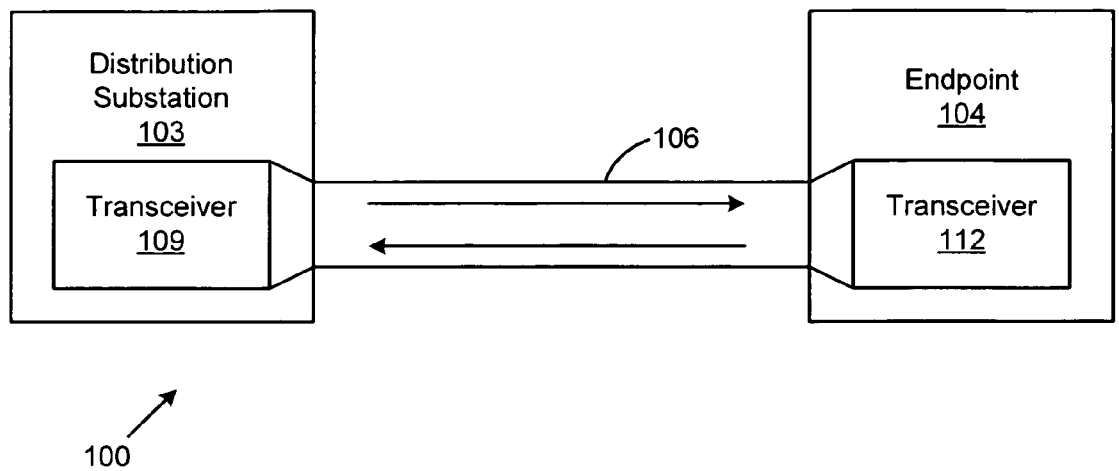
FIG. 1 depicts a distribution substation and an endpoint according to an embodiment of the disclosure.

Therefore, with reference to FIG. 1, shown is a block diagram of one link of an exemplary electrical distribution system 100 for distributing power between a distribution substation 103 and an endpoint 104, which can be incorporated with a customer device or electrical system at a power consumer's premises or site. An electrical distribution system 100, or distribution plant as it is sometimes referred to, is that part of an electric power system that receives power from a power generator via high-voltage transmission lines, reduces or steps down the voltage, and then distributes the power to an endpoint 104 at the premises of an energy customer. Within the electrical distribution system 100, distribution lines may conduct electricity from the distribution substation to the endpoints. Distribution lines may include underground cable, aerial cable, or overhead open-wire conductors carried on poles, or some combination of them.

There may be one or more layers of distribution substations 103 connected in series between the power generation and the endpoint 104, where each consecutive distribution substation further steps down the voltage of the transmitted electricity. Additionally, the depicted distribution substation 103 can also represent any other central office, data center, and/or other supplier infrastructure used to deliver electricity, telecommunications services, phone, internet, or other services as should be appreciated.

Additionally, the power generators, distribution substations, and endpoints may be organized in a network where various generators supplying power can be taken on or off line and the distribution substation through which a particular endpoint receives its electricity can be changed, all without a loss or interruption of power. Distribution transformers (not shown) may be connected in the distribution line between the distribution substation 103 and the endpoint 104, which the distribution transformers serve to further step-down the voltage to a level that is used by consumers. These step-down transformers, often referred to as pole transformers, supply a consumer or group of consumers over a secondary circuit. Each consumer is connected to the secondary circuit through its service leads and meter.

The distribution substation 103 shown in FIG. 1 may be configured to provide power to a customer device (not shown) or endpoint 104 via a communications link 106, which can also be referred to as a distribution line. The communications link 106 may be coupled to one or more step-down transformers before reaching the depicted endpoint 104. The communications link 106 may be configured to provide power from the distribution substation 103 to the endpoint 104. For a variety of reasons, it may be desirable to communicate information from the distribution substation 103 to one or more endpoints, such as an endpoint 104. As a non-limiting example, it may be desirable to meter, control or monitor usage data of the endpoint 104 to determine the power consumption at the endpoint 104. Additionally, control information could provide the ability to control or alter the operation of such an exemplary usage metering device and/or individual loads at the customer premise. As an additional non-limiting example, other services aside from power, such as telecommunications, internet, and/or other data services can also be provided via the distribution line and may utilize bi-directional communication between the distribution substation 103 and endpoint 104. In order to receive control information such as metering data or data from other data services in the distribution substation 103, a substation transceiver 112 can be employed to recognize the signals transmitted by an endpoint transceiver 112.

Other more general information, including, but not limited to, information to display or store the price of power at the customer premise, the date and time, the temperature and/or other information capable of being received and translated at the customer premise may also be transmitted along the distribution line. For example, the time displayed on an electronic device at the customer premise could be periodically adjusted to display an accurate time as transmitted by the utility station.

Various embodiments disclosed herein may be configured to communicate control signals and general information signals to endpoints 104 via the communications link 106 to control customer devices and provide more general information to the customer. Information from the customer device also may be sent via the communications link 106 to the distribution substation 103, thereby creating a two-way or bi-directional communications link via the distribution line 106. The aforementioned examples of control signal applications where control signals (and/or general information signals) are provided by the distribution substation to an endpoint 104 are merely representative of the various uses that such control signals provide. Therefore, the examples provided throughout the application are merely exemplary, as the invention is not limited to the transmission of any particular signal or service.

As three phase electronic power systems can be frequently employed for power distribution, such power systems can include three conductors carrying time offset waveforms. Accordingly, data can be transmitted via three substantially similar waveforms that can be reconciled by a transceiver, and/or data can be separately transmitted in each of the three waveforms. It should also be appreciated that a single phase waveform or combinations of any number of wave forms can be employed as well. Data can be embedded in any or all of the waveforms by employing various modulation schemes, which can include, but are not limited to: frequency-shift keying (FSK), on-off keying, amplitude shift keying, phase shift keying, quadrature amplitude modulation, minimum shift keying, continuous phase modulation, pulse position modulation, trellis modulation, and orthogonal frequency division multiplexing or other modulation schemes that should be appreciated whereby digital information can be transmitted on any or all of the waveforms employed in a power distribution system that may act as a carrier wave in such a scheme.

The electrical distribution system 100 including the communications link 106 and depicted in FIG. 1 therefore, may be configured to provide a full-duplex or bi-directional link between the distribution substation 103 and the endpoint 104. Full duplex in this non-limiting example may refer to simultaneous (and/or substantially simultaneous) communications in both directions, although the information sent in one direction may travel at a speed different from that of the information provided in the opposite direction. This full-duplex link via the communications link 106 may be configured to provide for transmission of control information, without the need for additional wiring over and above such wiring that is necessary for the transmission of electrical power.

It should be appreciated that the depicted power distribution system 100 of FIG. 1 is merely a depiction of a single exemplary link in such a system. It should further be appreciated that additional complexities utilized for the bulk distribution of electricity or other services can be incorporated into an embodiment of the present disclosure. It should also be appreciated that systems and methods disclosed herein may not be limited to use in a power distribution system 100, and that the depicted power distribution system 100 is but one example in which embodiments of the disclosure can be implemented. For example, systems and methods of an embodiment can be implemented in a software radio system other system employing a carrier wave and/or multiple modulation/demodulation schemes. It should also be noted that in operation, a distribution substation 103 can be coupled to more than one endpoint 104. As a non-limiting example, a distribution substation 103 may be coupled to hundreds or thousands of endpoints 104 configured in a unidirectional or bidirectional communications link over a distribution line 106.

Figure 2:
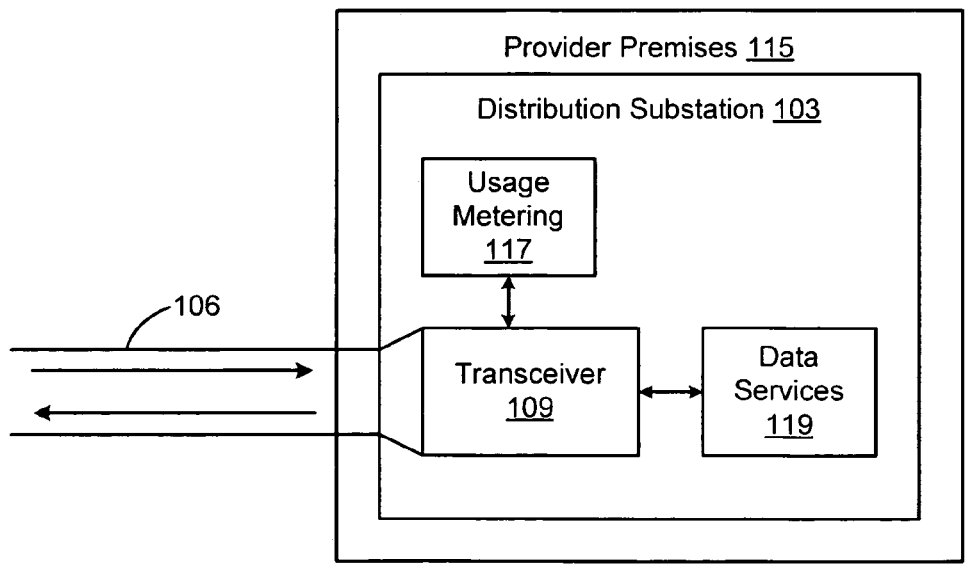
FIG. 2 depicts another exemplary embodiment of a distribution substation and an endpoint.

With reference to FIG. 2, shown is an alternative depiction of a distribution substation 103 according to an embodiment of the disclosure. The distribution substation 103 can, for example, be installed at an electricity provider premises 115 and be configured to receive data encoded on a distribution line. As a non-limiting example, the distribution line or communications link 106 can deliver power for consumption by the consumer as well as receive data for data services 119 via the transceiver 109. It should be appreciated that usage by a customer of electricity or other services may be metered so that the customer can be appropriately billed or charged according to such usage by various loads or other electrical devices at the customer premises. Accordingly, a usage metering device 117 or module can be in communication with the distribution substation 103 for the purposes of tracking or metering such usage and receiving usage data via the communications link 106 to the substation, central office, and/or billing center.

Figure 3:
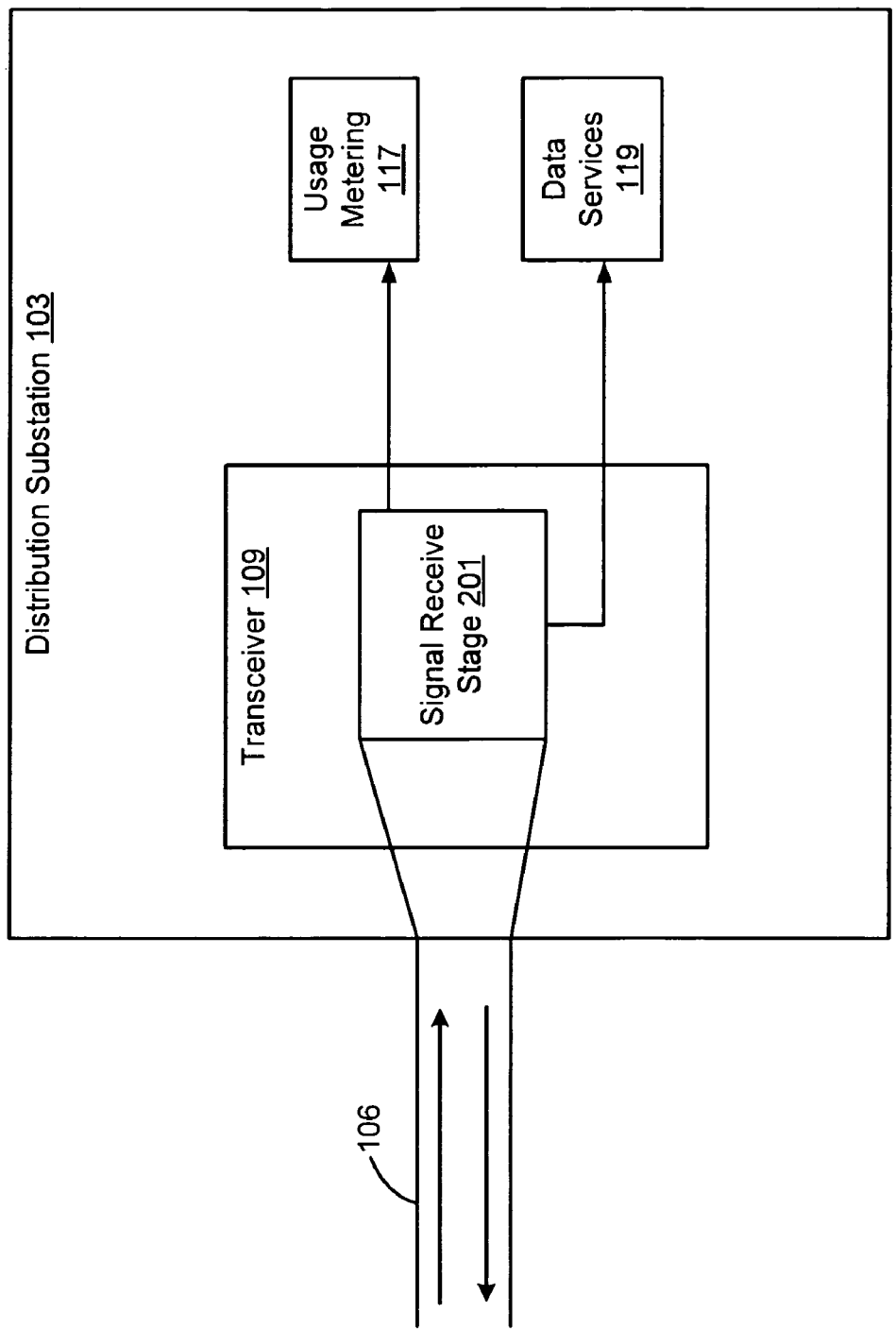
FIG. 3 depicts a distribution substation according to an embodiment of the disclosure.

With reference to FIG. 3, shown is an alternative depiction of a distribution substation 103 according to an embodiment of the disclosure. The distribution substation 103 can be configured to communicate with an endpoint 104 (FIG. 1). It should also be appreciated that the depicted transceiver 109 configuration can be implemented in an endpoint 104, repeater, transformer, or other nodes on a distribution line and employed to communicate with other nodes present on a communications link 106 in a power distribution system. In one embodiment, a transceiver 109 configured to send and/or receive signals in a power distribution system can have a signal receive stage 201 configured to extract a data signal sent from an endpoint 104 for data services 119, usage metering 117, or other purposes as can be appreciated.

The signal receive stage 201 can extract and combine a signal encoded on a three phase waveform where such signal or portions thereof can be encoded on more than one waveform comprising the three phase waveform according to a given encoding scheme. In one non-limiting embodiment, a data signal can be equally segmented onto various portions of the three waveforms comprising a three phase waveforms. In another embodiment, a data signal can be encoded on one waveform comprising a three phase waveform. However, due to the physical and electrical characteristics of a distribution line or communications link 106 (as well as noise that is introduced in the signal), the signal may bleed onto one or more of the other phases of the signal. For example, in a power distribution system, a communications link 106 may include three circuit conductors (e.g. three wire distribution line) to connect a distribution substation 103 and an endpoint 104.

Accordingly, due to physical and electrical properties that may affect a distribution line in a power distribution system (e.g. electromagnetic interference, inductive interference, interference caused by other devices or loads on the distribution line) the data signal encoded on the distribution line may degrade or bleed onto other circuit conductors in the distribution line. In other words, transmission of a signal on a distribution line in a power distribution system can introduce noise into the data signal. Accordingly, the signal receive stage 201 can be configured to compensate for such signal degradation or bleeding and extract the data signal from the communications link 106 as sent by another endpoint 104 or distribution substation 103.

Upon extraction of the data signal from the three phase waveform transmitted on the communications link 106, the signal receive stage 201 can convert the extracted signal to a digital signal and forward the digital signal to other components within or accessible to the endpoint 104. Alternatively, if the signal receive stage 201 is implemented in a distribution substation 103, the signal receive stage 201 can forward the digital signal to components within or accessible to the distribution substation 103. In the depicted non-limiting example, the signal receive stage 201 can forward a digital signal to usage metering 117 components as well as data services 119 components.

Figure 4:
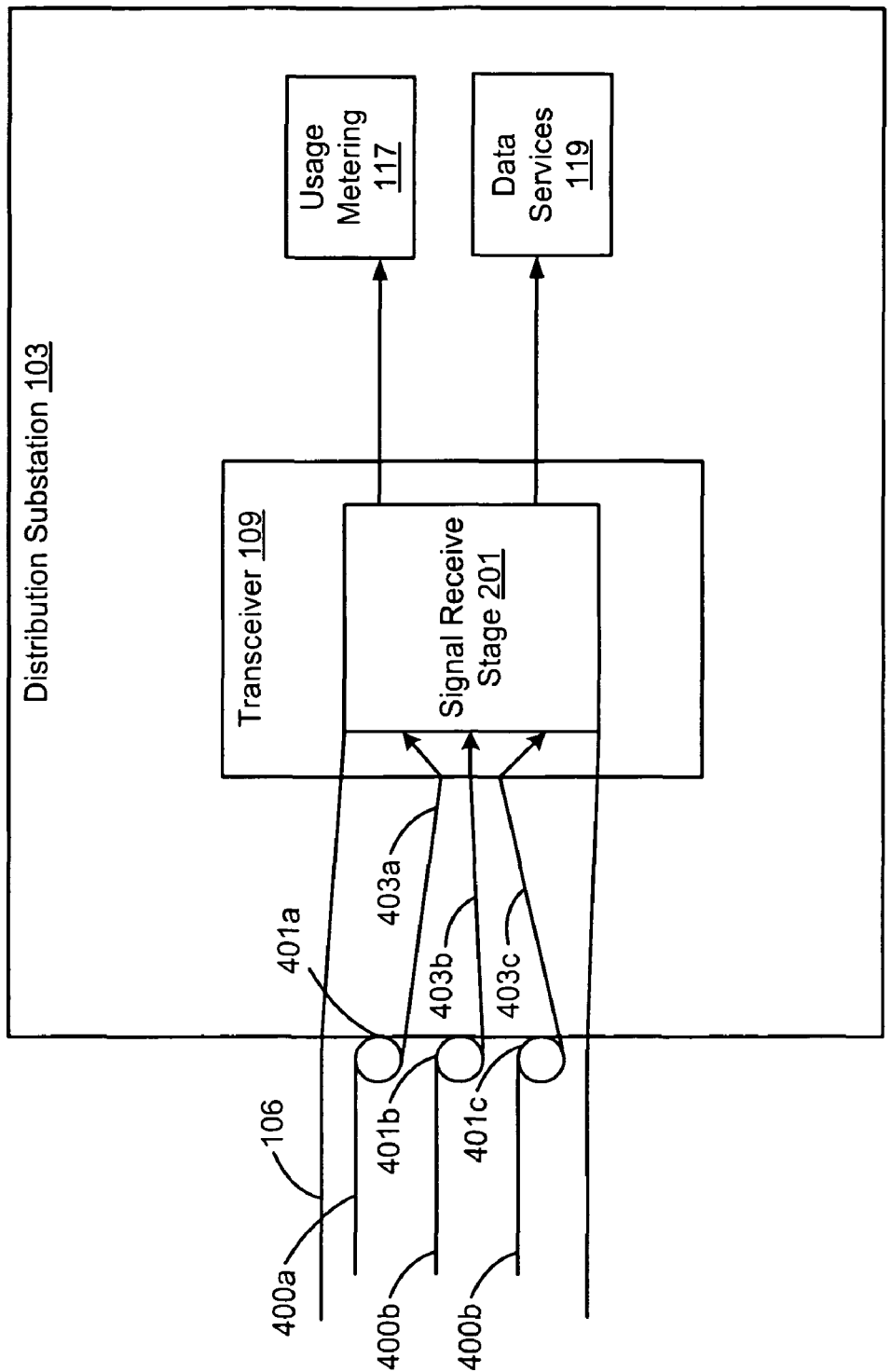
FIG. 4 depicts an alternative illustration of a distribution substation according to an embodiment of the disclosure.

With reference to FIG. 4, shown is an alternative depiction of an distribution substation 103 in a power distribution system. As noted above, a communications link 106, or distribution line in a power distribution system employing three phase electric power, can use a distribution line having three electrical conductors as a transmission medium. In the depicted example, the transmission wires 400a, 400b, 400c represent three electrical conductors in a distribution line in a power distribution system. Also in the depicted non-limiting example, each the three transmission wires 400 can be coupled to or terminate in an endpoint via a current transformer 401a, 401b, 401c.

A current transformer 401 can cause current to flow in internal lines 403a, 403b, 403c that is proportional the alternating current flowing in the transmission wires 400. It should be appreciated that such a termination scheme provides for safe isolation of a distribution substation 103 from potentially high voltages (e.g., 120V) present in a distribution line of a power distribution system. The depicted termination scheme further provides for transmission of a data encoded in a signal transmitted on the transmission wires 400, as the current generated in the internal lines 403 is proportional to the current transmitted in the transmission wires 400. The resultant current generated in the internal lines 403 is further coupled to the transceiver 109, which can additionally couple the internal lines 403 to the signal receive stage 201. The signal receive stage 201 can accordingly extract a data signal encoded on the three phase waveform received from the communications link 106 or distribution line.

Figure 5:
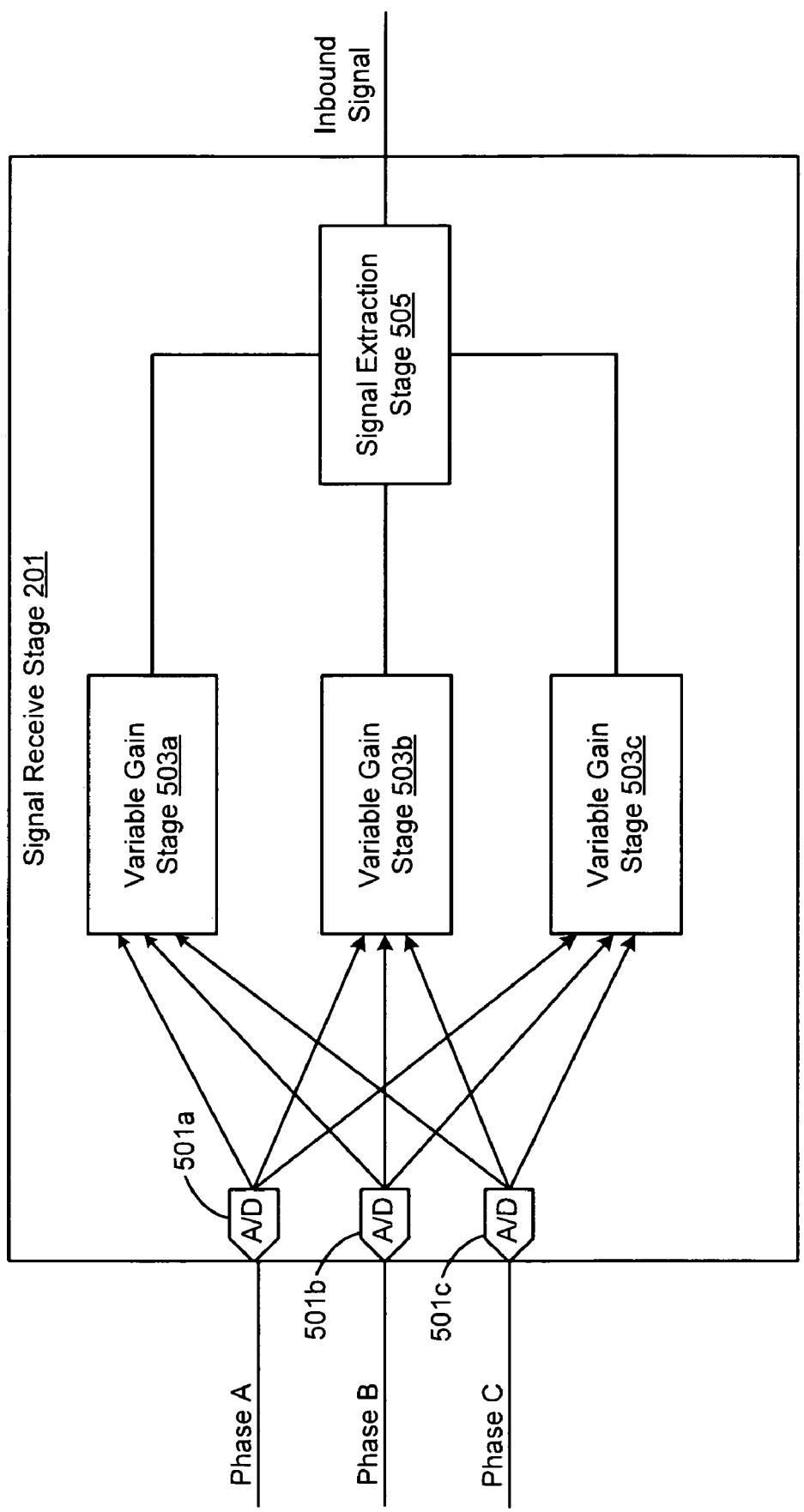
FIG. 5 depicts a signal receive stage according to an embodiment of the disclosure.

With reference to FIG. 5, shown is one example of a signal receive stage 201 within a transceiver 109 (FIG. 2) according to an embodiment of the disclosure. Because (as noted above) a transceiver 109 can be implemented in an endpoint 104 and/or a distribution substation 103, or other components or nodes of a power distribution system, the depicted signal receive stage 201 can likewise be implemented within any of the various components of a power distribution system. The signal receive stage 201 can include one or more converters 501 configured to receive three analog waveforms comprising a three phase waveform and convert the analog waveforms to a digital signal. Accordingly, each of the digital signals corresponding to a waveform of a three phase waveform in a power distribution system can be communicated to at least one variable gain stage 503a, 503b, 503c.

The variable gain stage 503 can receive each of the digital signals corresponding to an analog waveform and adjust the amplitude of the digital signal either positively or negatively. The variable gain stage 503 can accordingly combine the three (in a three-phase power distribution system) digital signals and output a gain adjusted combined signal. In one embodiment, the variable gain stage 503 can sum adjusted digital signals corresponding to Phase A, Phase B, and Phase C in the depicted example. In another embodiment, the variable gain stage 503 can combine the digital signals in another fashion as can be appreciated.

The variable gain stage 503 is configurable, allowing the gain of each of the inputted digital signals corresponding to Phase A, Phase B, and Phase C of a three phase waveform to be modified to varying degrees. These varying degrees can depend on the electrical and/or environmental conditions affecting the quality of the signal on a communications link 106 (FIG. 1). In one embodiment, variable gain stage 503a can adjust the digital signal corresponding to Phase A by multiplying its amplitude by two, the digital signal corresponding to Phase B by multiplying its amplitude by one (e.g. leaving the signal unchanged), and the digital signal corresponding to Phase C by multiplying its amplitude by negative one. Variable gain stages 503b, 503c can be configured to adjust the digital signals corresponding to Phase A, Phase B, and Phase C by varying degrees that may differ from the configuration chosen for variable gain stage 503a, allowing a system operator the flexibility to adjust an endpoint 104 or distribution substation 103 transceiver 112/109 to arrive at an optimal signal to noise ratio. The above example of gain adjustment is merely exemplary, and discussed only to demonstrate the flexibility the variable gain stages 503a, 503b, 503c provide.

The signal extraction stage 505 can receive the combined adjusted signals produced by the variable gain stages 503a, 503b, 503c and extract various channels of digital data signal encoded on the three phase waveform extracted from the communications link 106 to produce an inbound signal. As the communications theories employed to extract such various channels of digital data from an analog waveform should be appreciated by one of ordinary skill in the art, further detail need not be discussed herein.

Figure 6:
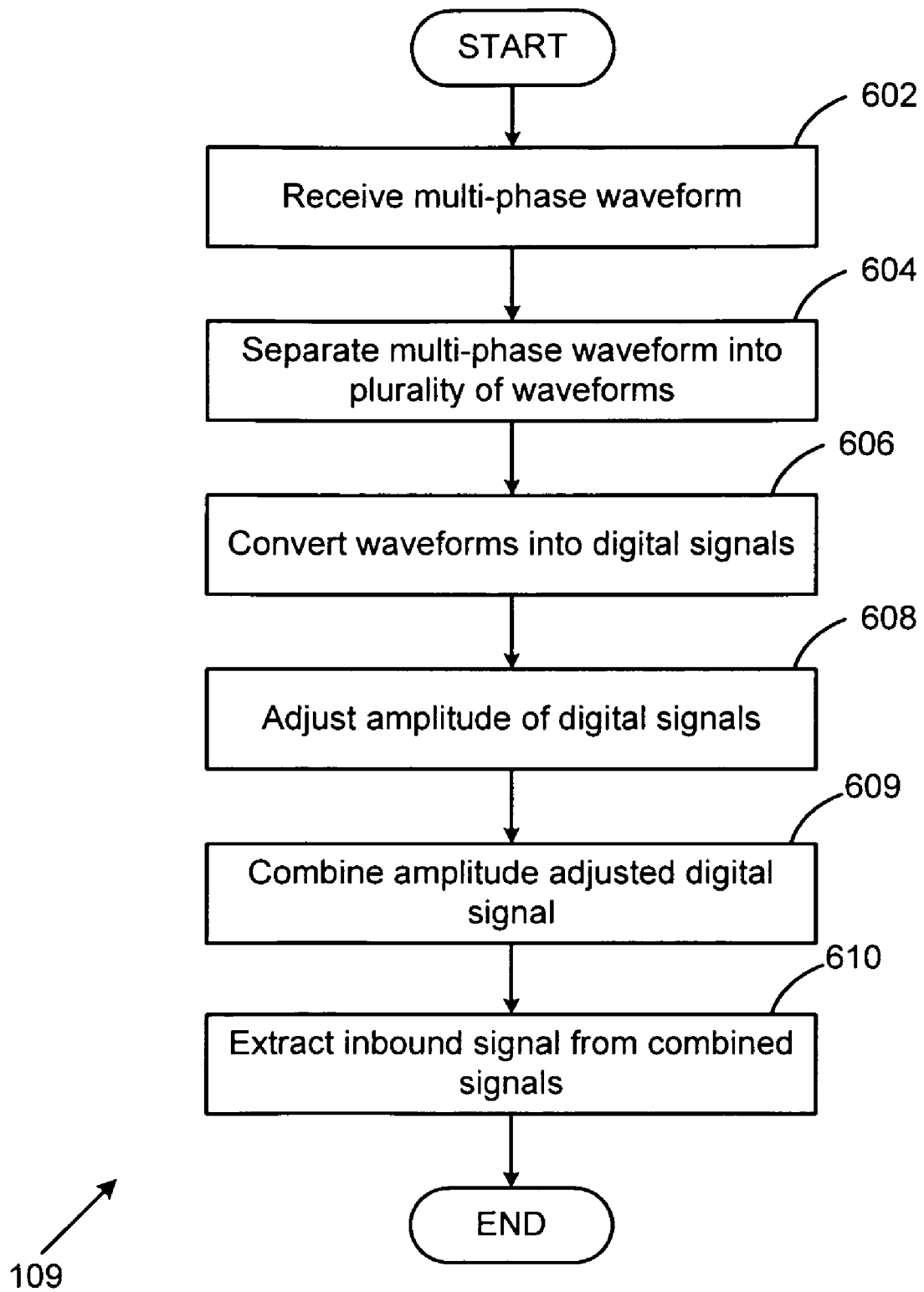
FIG. 6 depicts an exemplary embodiment of a process in accordance with the disclosure.

With reference to FIG. 6, shown is one example of a process according to one embodiment of the disclosure. The depicted process illustrates operation of a transceiver 109 (FIG. 1). The depicted process can be implemented in a computing system and/or digital signal processing system. In box 602, a multi-phase waveform is received. As noted above, in a power distribution system, a three phase waveform can be used to transmit AC electricity, and a data signal can be encoded on the three phase waveform. In box 604, the multi-phase waveform is separated into a plurality of analog waveforms. In the case of a three phase waveform, the three phase waveform is separated into three analog waveforms.

In box 606, the analog waveforms are converted into digital signals corresponding to the analog waveforms. In box 608, the amplitude of the digital signals can be adjusted to achieve an optimal signal to noise ratio. As noted above, various electrical and/or environmental conditions can cause degradation and/or bleeding the multi-phase waveform. Accordingly, a system operator can adjust the degree to which amplitudes are adjusted in order to achieve the optimal signal to noise ratio. In box 609, the amplitude adjusted digital signals can be combined via summation.

In box 610, an inbound data signal is extracted from the combined signal according to a demodulation scheme. Such a demodulation scheme can include, but is not limited to: frequency shift keying, on-off keying, amplitude shift keying, phase shift keying, quadrature amplitude modulation, minimum shift keying, continuous phase modulation, pulse position modulation, trellis modulation, and orthogonal frequency division multiplexing.

Figure 7:
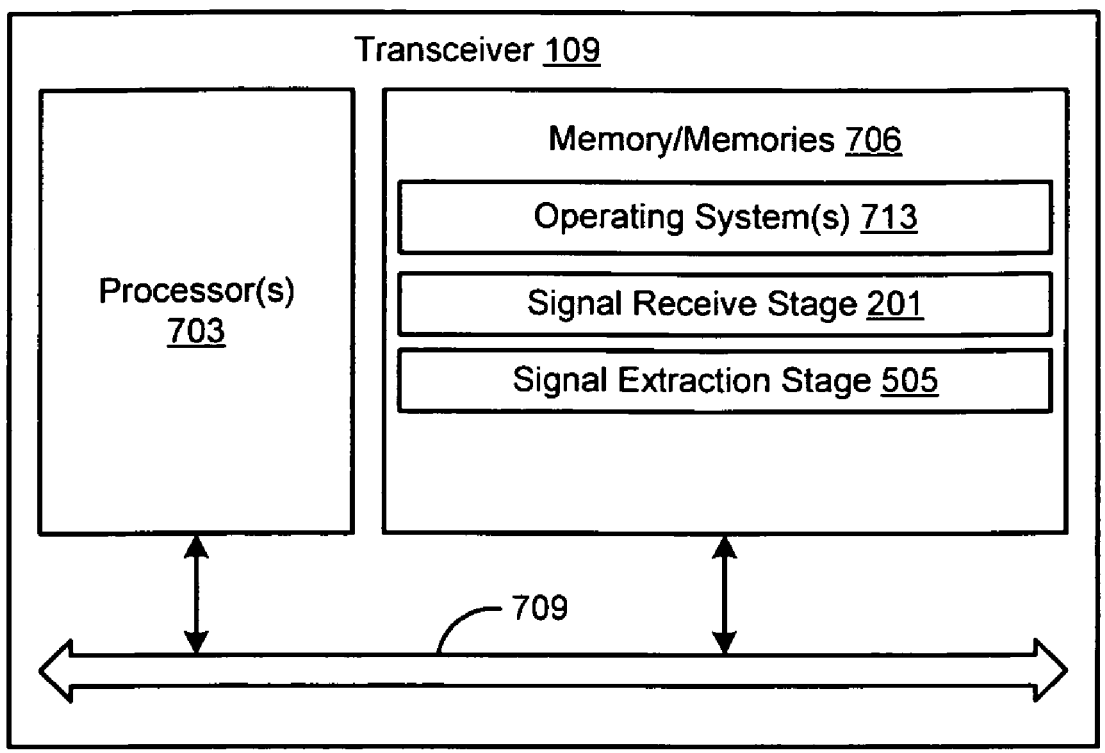
FIG. 7 depicts an exemplary embodiment of a transceiver in accordance with the disclosure.

With reference to FIG. 7, shown is one additional example of transceiver 109 implementing at least a signal receive stage 201 includes an embedded system, one or more digital signal processors, computer, and/or equivalent device according to an embodiment of the present disclosure. In implementing the above described embodiments, the transceiver 109 implementing a signal receive stage 201 can include one or more processor circuits having a processor 703 and a memory 706, which are coupled to a local interface or bus 709. In this respect, the local interface or bus 709 may comprise, for example, a data bus with an accompanying control/address bus as can be appreciated.

Stored on the memory 706 and executable by the processor 703 are various components such as an operating system 713. In addition, it is understood that many other components may be stored in the memory 706 and executable by the processor (s) 703. Also, such components may reside in a memory that is external from the distribution substation 103 as can be appreciated. It should also be noted that the transceiver 109, for example, may also include additional ports that for additional external connectivity, memory interfaces, or other ports that are not shown as they are not necessary for an appreciation of the disclosed architecture.

As set forth above, a number of components are stored in the memory 706 and are executable by the processor 703. In this respect, the term "executable" refers to a program file that is in a form that can ultimately be run by the processor 703. Examples of executable programs may be, for example, a compiled program that can be translated into machine code in a format that can be loaded into a random access portion of the memory 706 and run by the processor 703, or source code that may be expressed in proper format such as object code that is capable of being loaded into a random access portion of the memory 706 and executed by the processor 703. An executable program may be stored in any portion or component of the memory 706 including, for example, random access memory, read-only memory, a hard drive, compact disk (CD), floppy disk, or other memory components.

The memory 706 is defined herein as volatile and/or nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 703 may represent multiple processors and the memory 706 may represent multiple memories that operate in parallel. In such a case, the bus 709 may be an appropriate network that facilitates communication between any two of the multiple processors, between any processor and any one of the memories, or between any two of the memories, etc. The processor 703 may be of electrical, optical, or of some other construction as can be appreciated by those with ordinary skill in the art.

The operating system 713 is executed to control the allocation and usage of hardware resources such as the memory and processing time in the transceiver 109. In this manner, the operating system 713 serves as the foundation on which applications depend as is generally known by those with ordinary skill in the art.

The flow chart of FIG. 6 shows the functionality and operation of an implementation of a transceiver 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system.

Although the functionality of various embodiments are described above with respect to the drawings as being embodied in software or code executed by general purpose or digital signal processing hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, digital signal processors, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, the following is claimed:

1. A system for decoding a three phase waveform, comprising:
   a receive stage configured to receive the three phase waveform having data encoded thereon from a distribution line in a power distribution system and separate the three phase waveform into a first waveform, a second waveform, and a third waveform, wherein the data is encoded on one or more of the first waveform, the second waveform, and the third waveform;
   an analog-to-digital converter configured to convert the first waveform, the second waveform, and the third waveform into a first digital signal, a second digital signal, and a third digital signal;
   a first gain stage, a second gain stage, and a third gain stage, wherein each of the first gain stage, the second gain stage, and the third gain stage is configured to adjust an amplitude of the first digital signal, the second digital signal, and the third digital signal, wherein each of the first gain stage, the second gain stage, and the third gain stage are further configured to combine by summation the amplitude adjusted digital signals into a first gain adjusted combined signal, a second gain adjusted combined signal, and a third gain adjusted combined signal wherein the data is encoded on one or more of the first gain adjusted combined signal, the second gain adjusted combined signal, and the third gain adjusted combined signal; and
   a signal extraction stage configured to extract signal comprising the data from the first gain adjusted combined signal, the second gain adjusted combined signal, and the third gain adjusted combined signal.

2. The system of claim 1 wherein the first gain adjusted combined signal, the second gain adjusted combined signal, and the third gain adjusted combined signal are combined according to varying schemes, the system further comprising sampling the first gain adjusted combined signal, the second gain adjusted combined signal, and the third gain adjusted combined signal to determine an optimal signal-to-noise ratio amongst the combined signals.

3. A system for decoding a multi-phase waveform, comprising:
   a receive stage configured to receive the multi-phase waveform having data encoded thereon and separate the multi-phase waveform into a plurality of waveforms, wherein the data is encoded on one or more of the plurality of waveforms,
   a plurality of analog-to-digital converters configured to convert the plurality of analog waveforms into a plurality of digital signals;
   a plurality of gain stages, wherein each of the plurality of gain stages is configured to adjust an amplitude of each of the digital signals, each of the plurality of gain stages further configured to combine the amplitude adjusted digital signals into a plurality of gain adjusted combined signals, wherein the data is encoded on one or more of the plurality of gain adjusted combined signals; and
   a signal extraction stage configured to extract a signal comprising the data from the plurality of gain adjusted combined signals.

4. The system of claim 3, wherein the plurality of gain stages is further configured to combine the digital signals into plurality of gain adjusted combined signals by summing a first subset of the digital signals into a first gain adjusted combined signal.

5. The system of claim 3, wherein the multi-phase waveform further comprises a three phase waveform.

6. The system of claim 5, wherein the plurality of analog-to-digital converters converts each of three waveforms of the three phase waveform and the plurality of digital signals further comprises a first digital signal, a second digital signal, and a third digital signal.

7. The system of claim 6, wherein the plurality of gain stages comprises a first gain stage, a second gain stage, and a third gain stage.

8. The system of claim 7, wherein the first gain stage, the second gain stage, and a third gain stage are configured to adjust the amplitude of the digital signals to varying degrees and the plurality of gain adjusted combined signals further comprises a first gain adjusted combined signal, a second gain adjusted combined signal, and a third gain adjusted combined signal.

9. The system of claim 8, wherein the signal extraction stage extracts the signal from the first gain adjusted combined signal, the second gain adjusted combined signal, and the third gain adjusted combined signal according to a demodulation scheme, the demodulation scheme being at least one of: frequency shift keying, on-off keying, amplitude shift keying, phase shift keying, quadrature amplitude modulation, minimum shift keying, continuous phase modulation, pulse position modulation, trellis modulation, and orthogonal frequency division multiplexing.

10. The system of claim 3, wherein the multi-phase waveform further comprises a three phase waveform transmitted on a distribution line in a power distribution system.

11. A method for decoding a multi-phase analog waveform, comprising the steps of:
   receiving the multi-phase analog waveform having data encoded thereon;
   separating the multi-phase analog waveform into a plurality of analog waveforms, wherein the data is encoded on one or more of the plurality of analog waveforms;
   converting each of the waveforms into a plurality of digital signals;

transmitting the digital signals to a plurality of gain stages, each of the plurality of gain stages configurable to adjust an amplitude of each of the digital signals;

adjusting the amplitude of each of the digital signals;

combining the amplitude adjusted digital signals into plurality of gain adjusted combined signals, wherein the data is encoded on one or more of the plurality of gain adjusted combined signals; and extracting a signal comprising the data from the plurality of gain adjusted combined signals.

12. The method of claim 11, wherein the step of combining the amplitude adjusted digital signals into the plurality of gain adjusted combined signals further comprises summing a first subset of the digital signals into a first gain adjusted combined signal.

13. The method of claim 11, wherein the multi-phase waveform further comprises a three phase waveform.

14. The method of claim 13, wherein the step of converting each of the waveforms into the plurality of digital signals further comprises converting each of three waveforms of the three phase waveform and the plurality of digital signals further comprises a first digital signal, a second digital signal, and a third digital signal.

15. The method of claim 14, wherein the plurality of gain stages comprises a first gain stage, a second gain stage, and a third gain stage.

16. The method of claim 15, wherein the first gain stage, the second gain stage, and a third gain stage are configured to adjust the amplitude of the digital signals to varying degrees and the plurality of gain adjusted combined signals further comprises a first gain adjusted combined signal, a second gain adjusted combined signal, and a third gain adjusted combined signal.

17. The method of claim 16, wherein the signal is extracted from the first gain adjusted combined signal, the second gain adjusted combined signal, and the third gain adjusted combined signal according to a demodulation scheme, the demodulation scheme being at least one of: frequency shift keying, on-off keying, amplitude shift keying, phase shift keying, quadrature amplitude modulation, minimum shift keying, continuous phase modulation, pulse position modulation, trellis modulation, and orthogonal frequency division multiplexing.

18. The method of claim 11 further comprising adjusting the phase of each of the analog waveforms to determine an optimal signal combination of the each of the analog waveforms, wherein the optimal signal combinations are used to increase the signal-to-noise ratio of a communications system comprising the analog waveforms.

19. A non-transitory computer readable medium comprising a program for decoding a multi-phase analog waveform, the program when executed by a processor causing the processor to perform the steps:

receiving the multi-phase analog waveform having data encoded thereon;

separating the multi-phase analog waveform into a plurality of analog waveforms wherein the data is encoded on one or more of the plurality of analog waveforms;

converting each of the waveforms into a plurality of digital signals;

transmitting the digital signals to a plurality of gain stages, each of the plurality of gain stages configurable to adjust an amplitude of each of the digital signals;

adjusting the amplitude of each of the digital signals;

combining the amplitude adjusted digital signals into plurality of gain adjusted combined signals, wherein the data is encoded on one or more of the plurality of gain adjusted combined signals; and extracting an signal comprising the data from the plurality of gain adjusted combined signals.

20. The non-transitory computer readable medium of claim 19, wherein the step of combining the amplitude adjusted digital signals into the plurality of gain adjusted combined signals further comprises summing a first subset of the digital signals into a first gain adjusted combined signal.

21. The non-transitory computer readable medium of claim 19, wherein the multi-phase waveform further comprises a three phase waveform.

22. The non-transitory computer readable medium of claim 21, wherein the step of converting each of the waveforms into the plurality of digital signals further comprises converting each of three waveforms of the three phase waveform and the plurality of digital signals further comprises a first digital signal, a second digital signal, and a third digital signal.

23. The non-transitory computer readable medium of claim 22, wherein the plurality of gain stages comprises a first gain stage, a second gain stage, and a third gain stage.

24. The non-transitory computer readable medium of claim 23, wherein the first gain stage, the second gain stage, and a third gain stage are configured to adjust the amplitude of the digital signals to varying degrees and the plurality of gain adjusted combined signals further comprises a first gain adjusted combined signal, a second gain adjusted combined signal, and a third gain adjusted combined signal.

* * * * *